United States Patent
Krishnasamy et al.

(10) Patent No.: US 8,910,165 B2
(45) Date of Patent: Dec. 9, 2014

(54) PROVIDING THREAD SPECIFIC PROTECTION LEVELS

(75) Inventors: Sivakumar Krishnasamy, Bangalore (IN); Ashok Kumar Jagadeeswaran, TamilNadu (IN); Ismail S. Khan, Bangalore (IN); Shajith Chandran, Bangalore (IN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 408 days.

(21) Appl. No.: 12/579,103

(22) Filed: Oct. 14, 2009

(65) Prior Publication Data
US 2011/0088033 A1   Apr. 14, 2011

(51) Int. Cl.
*G06F 9/44* (2006.01)
*G06F 9/46* (2006.01)
*G06F 15/16* (2006.01)
*G06F 21/00* (2013.01)

(52) U.S. Cl.
CPC .................................. *G06F 9/468* (2013.01)
USPC ........... 718/100; 709/201; 709/202; 709/217; 709/223; 709/229; 726/1; 726/2; 726/4; 726/27

(58) Field of Classification Search
None
See application file for complete search history.

(56) References Cited

U.S. PATENT DOCUMENTS

| | | | |
|---|---|---|---|
| 6,192,389 B1 * | 2/2001 | Ault et al. | 718/101 |
| 6,850,959 B1 * | 2/2005 | Golds | 707/822 |
| 7,143,414 B2 | 11/2006 | Heddes et al. | |
| 7,305,582 B1 | 12/2007 | Moser et al. | |
| 7,310,677 B1 * | 12/2007 | Cohen et al. | 709/229 |
| 7,953,878 B1 * | 5/2011 | Trimble | 709/230 |
| 8,510,805 B2 * | 8/2013 | Zhang et al. | 726/4 |
| 8,621,605 B2 * | 12/2013 | Burugula et al. | 726/22 |
| 8,640,230 B2 * | 1/2014 | Greenwood et al. | 726/21 |
| 2003/0097488 A1 * | 5/2003 | Bauman et al. | 709/328 |
| 2003/0131041 A1 * | 7/2003 | Dinker et al. | 709/104 |
| 2003/0145035 A1 | 7/2003 | de Bonet | |
| 2005/0198637 A1 * | 9/2005 | Kogan et al. | 718/100 |
| 2005/0210472 A1 | 9/2005 | Accapadi et al. | |
| 2006/0101463 A1 * | 5/2006 | Poisner | 718/100 |
| 2006/0168585 A1 | 7/2006 | Greevski et al. | |
| 2006/0259487 A1 * | 11/2006 | Havens et al. | 707/9 |
| 2007/0027872 A1 * | 2/2007 | Johnson et al. | 707/9 |
| 2007/0078852 A1 * | 4/2007 | Chen et al. | 707/8 |

(Continued)

OTHER PUBLICATIONS

Love, Linux Kernel Development 2nd ed. (2005)—sample chapter.*

(Continued)

*Primary Examiner* — Thomas Lee
*Assistant Examiner* — Benjamin Wu
(74) *Attorney, Agent, or Firm* — Katherine S. Brown; Jeffrey L. Streets

(57) ABSTRACT

Techniques are disclosed for providing thread specific protection levels in a multithreaded processing environment. An associated method includes generating a group of threads in a process, one of the group of threads opening a thread entity, and that one of the group of threads specifying one or more levels of access to the thread entity for the other threads. In one embodiment, when a first of the threads attempts to perform a specified operation on the thread entity, the method of this invention determines whether that first thread is the one of the group of threads that opened the thread entity. When the first thread is not that one of the group of threads, the first thread is allowed to perform the specified operation if and only if such operation is permitted by the specified one or more levels of access.

12 Claims, 2 Drawing Sheets

(56) References Cited

U.S. PATENT DOCUMENTS

| | | | |
|---|---|---|---|
| 2007/0101335 A1* | 5/2007 | Nagampalli et al. | 718/102 |
| 2008/0072236 A1* | 3/2008 | Pope et al. | 718/108 |
| 2008/0077922 A1* | 3/2008 | Doring | 718/100 |
| 2009/0031402 A1* | 1/2009 | Jung et al. | 726/4 |
| 2009/0064342 A1* | 3/2009 | Chan et al. | 726/27 |
| 2009/0327498 A1* | 12/2009 | Sampath et al. | 709/228 |
| 2010/0057774 A1* | 3/2010 | Pizano et al. | 707/103 R |

OTHER PUBLICATIONS

IPC & Threads lecture notes (2006).* di Vimercati et al., Policies, Models, and Languages for Access Control (2005).*

"POSIX Threads Programming", http://computing.llnl.gov/tutorials/pthreads; pp. 1-40.

* cited by examiner

PROVIDING THREAD SPECIFIC PROTECTION LEVELS

TRADEMARKS

IBM® is a registered trademark of International Business Machines Corporation, Armonk, N.Y., U.S.A. Other names used herein may be registered trademarks, trademarks or product names of International Business Machines Corporation or other companies. Microsoft® and Windows® are registered trademarks of Microsoft Corporation.

BACKGROUND

Multi processor computer systems have become commonplace in the last few years. In these systems, a process is separated into component instruction sequences, referred to as threads that are processed concurrently by the multiple processors. In some computer systems such as the BluGene computer system developed by the International Business Machines Corporation (IBM), there may be many thousands of threads executing at the same time. Even in the more traditional computer systems such as the eServer iSeries developed by IBM, some Websphere applications may have many hundreds of threads.

In a multithreaded environment any thread can operate on a file/socket descriptor (referred to herein as "thread entities") opened by a parent thread. There are scenarios where a file or a socket opened by one thread is inadvertently closed or its contents corrupted by some other thread. There are no known solutions for this issue as all the threads in a process share the same thread entities, which are global. It would be beneficial in some embodiments to provide a mechanism to ameliorate the above mentioned scenarios by specifying protection levels on thread entities created by parent threads.

SUMMARY OF THE INVENTION

An embodiment of the invention provides a method, system, and computer program product for providing thread specific protection levels in a multithreaded processing environment. The method includes generating a group of threads in a process, one of the groups of threads opening a thread entity, and the one of the group of threads specifying one or more levels of access to the thread entity for the others of the group of threads.

In one embodiment, the method further includes a first of the group of threads attempting to perform a specified operation on the thread entity, and determining whether the first of the group of threads is the one of the group of threads. In this embodiment, when the first of the group of threads is the one of the group of threads, the first of the group of threads performing the specified operation; and when the first of the group of threads is not the one of the group of threads, the first of the group of threads performing the specified operation if and only if the specified operation is permitted by the specified one or more levels.

These specified levels of thread access include, for example, a first level that allows the other threads read only access to the thread entity, a second level that allows the other threads write only access to the thread level, a third level that allows the other threads only read and write access to the thread entity. These levels of access may further include a fourth level that allows the other threads no access to the thread entity, and a fifth level that allows the other threads read and write access to the thread entity but prohibits any of these other threads from closing the thread entity.

With this disclosure, any thread inside a process can specify a level of protection on the thread entities when the thread opens those entities. The thread may specify whether other threads in process can write/read from the thread entity, other threads are denied write/read access to the thread entity, or other threads can read/write but cannot close this thread entity. Also, the thread can omit this option completely, thereby reverting to the normal behavior, providing complete access to thread entity.

The thread may also decide to set these thread entity protection levels (TEPL) at a later stage through a system call interface provided for this purpose, but the thread is allowed to set restrictions only on thread entities previously opened by the thread.

Further benefits and advantages of this invention will become apparent from a consideration of the following detailed description, given with reference to the accompanying drawings, which specify and show preferred embodiments of the invention.

DETAILED DESCRIPTION

Figure 1:
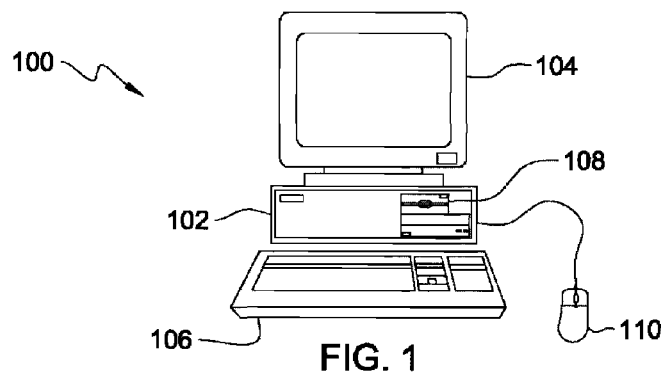
FIG. 1 is an exemplary representation of a data processing system that may be used to implement embodiments of the invention.

Reference will now be made in detail to the subject matter disclosed, which is illustrated in the accompanying drawings. It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the disclosure, as claimed, but is merely representative of the embodiments of the invention.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the embodiments of the invention. The illustrated embodiments of the invention will be best understood by reference to the drawings. The following description is intended only by way of example and simply illustrates certain selected exemplary embodiments of the invention as claimed herein.

The flowchart and block diagrams in the Figures illustrate the architecture, functionality, and operation of possible implementations of systems, methods and computer program products according to various embodiments of the invention.

In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, embodiments of the invention may be presented as a system, method or computer program product. Accordingly, embodiments of invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments of the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory.

In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an exemplary representation of a data processing system in which embodiments of the invention may be implemented is depicted. A computer 100 is depicted which includes system unit 102, video display terminal 104, keyboard 106, storage devices 108, which may include floppy drives and other types of permanent and removable storage media, and mouse 110. Additional input devices may be included with computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
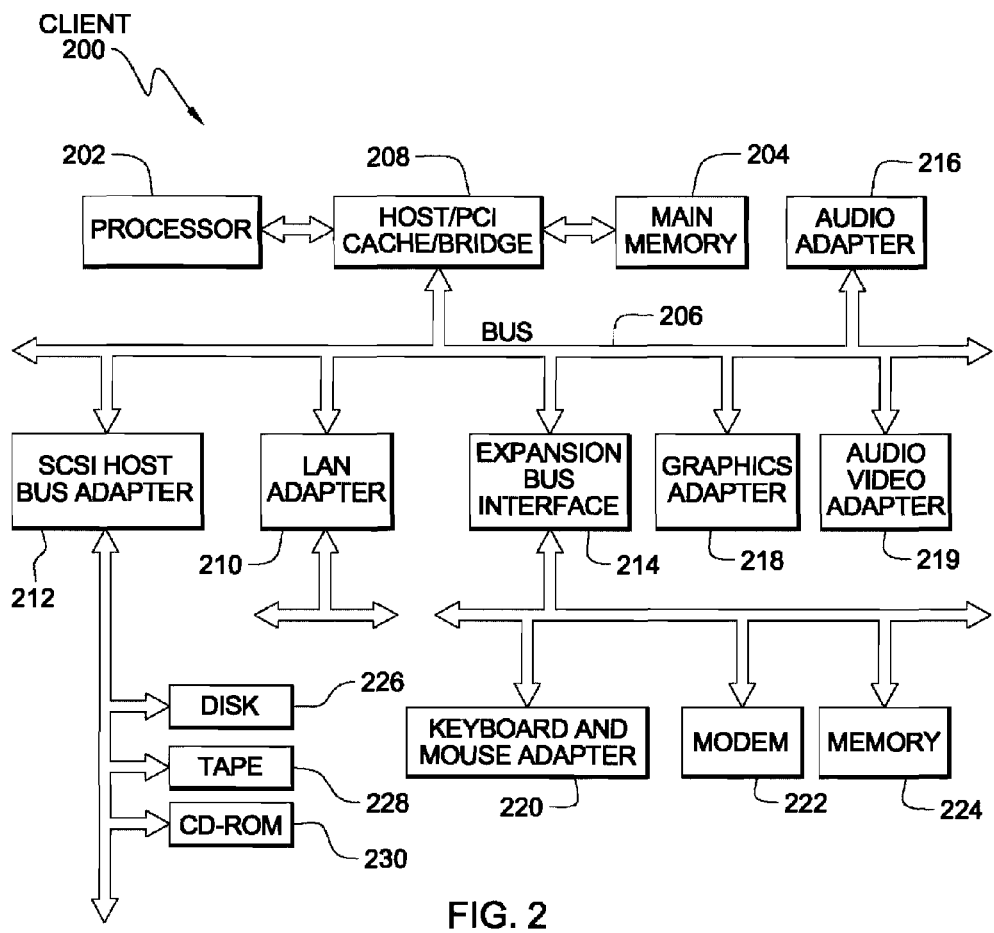
FIG. 2 is an exemplary embodiment of a block diagram of a data processing system in which embodiments of the invention may be implemented.

With reference now to FIG. 2, an exemplary embodiment of a block diagram of a data processing system is shown in which embodiments of the invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used.

Processor system 202 and main memory 204 are connected to PCI local bus 206 through PCI bridge 208. PCI bridge 208 also may include an integrated memory controller and cache memory for processor system 202. Processor system 202 is representative of a multiple processor system having two or more multi-processor modules such as a dual-processor module, a multi-processor module, or dual or multi-SMT processors. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor system 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor system 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 includes some type of network communication interface. The depicted example in FIG. 2 and above-described examples are not meant to imply architectural limitations. The processes of the present invention are performed by processor system 202 using computer implemented instructions, which may be located in a memory such as, for example, main memory 204, memory 224, or in one or more peripheral devices 226-230.

Figure 3:
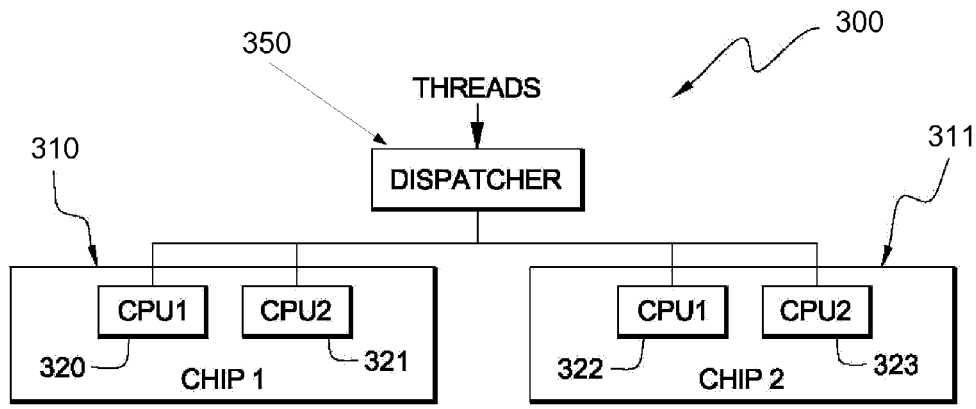
FIG. 3 illustrates an exemplary embodiment of a mechanism for dispatching threads in a multi-processor computing system.

FIG. 3 is an exemplary diagram of a multi-processor system 300 in which an embodiment of the invention may be implemented. MP system 300 is an example of a data processing system, such as data processing system 200 in FIG. 2. As shown in FIG. 3, MP system 300 includes dispatcher 350 and a plurality of processors 320-323. Dispatcher 350 assigns threads to processors in system 300. Although dispatcher 350 is shown as a single centralized element, dispatcher 350 may be distributed throughout MP system 300. For example, dispatcher 350 may be distributed such that a separate dispatcher is associated with each processor 320-323 or a group of processors, such as processor deployed on a common chip. Furthermore, dispatcher 350 may be implemented as software instructions run on processor 320-323 of the MP system 300.

Micro processor system 300 may be any type of system having a plurality of multi-processor modules. As used herein, the term "processor" refers to either a central processing unit or a thread processing core of an SMT processor. Thus, a multi-processor module is a processor module having a plurality of processors, or (CPUs), deployed on a single chip, or a chip having a single CPU capable of simultaneous execution of multiple threads, e.g., an SMT CPU or the like. In the illustrative example, processors 320 and 321 are deployed on a single multi-processor module 310, and processors 322 and 323 are deployed on a single multi-processor module 311. As referred to herein, processors on a single multi-processor module, or chip, or said to be adjacent. Thus, processors 320 and 321 are adjacent, as are processors 322 and 323.

In a multithreaded environment, whenever a file/socket is opened, any other thread in the process can access the thread entities. Embodiments of the invention provide a way for a thread to provide specific protection levels to other threads in the process of accessing the thread entities. This can be achieved by providing special flags, which can be used during the file or socket open calls.

For example, in one embodiment, an open call with Thread Entity Protection Levels (TEPL) looks like: th_open(<filename>,O_CREAT|O_TEPL_RDONLY).

When the above call is executed, the thread identifier (ID) of the current thread (hence parent thread for this thread entity) is stored in an appropriate structure (for example, a UNIX file descriptor table), along with the O_TEPL_RDONLY permission level for the opened entity. Now the other threads can only perform read operation on this entity.

In a further embodiment, a thread entity can have one of the following permissions:
O_TEPL_RDONLY Other threads are allowed only to read
O_TEPL_WRONLY Other threads are allowed only to write
O_TEPL_RDWR Other threads are allowed only to read/write
O_TEPL_EXCL No access allowed to other threads
O_TEPL_NOCLOSE Other threads can read/write but not close this thread entity Similarly, the TEPLs can be set using "fcntl" system calls. When file operations other than open are performed on a file descriptor ("fd"), the thread ID of the current thread is matched against the stored thread ID (parent thread ID) for that "fd". If they do not match, the operations continue only when the TEPL flags allow the specified operation. "fcntl" is a standard UNIX system call used to perform operations on a "fd".

If no TEPLs are specified for the thread entity, then all threads are allowed all permitted operations.

Upon exit of the parent thread, the thread entities that were not explicitly closed remain open and their parent is set to the Main thread (process), i.e., the Main thread inherits all the TEPLs. For these thread entities that remain open, the descriptors accessing the files/sockets remain unchanged.

These thread entities will be cleaned up when the process exits.

The serialization of the files/socket read/writes continue to remain unchanged when the O_TEPL_RDONLY/O_TEPL_RDWR or O_TEPL_WRONLY are set. However, the possibility of other threads corrupting the data referenced by the thread entities may be addressed by using the O_TEPL_RDONLY flag, which will allow only read access to threads, other than the parent thread. Thus, the parent thread is assured that the thread entity on which it is operating will not be corrupted/closed by the other threads that merely have read permissions. For example, if the parent thread wants the other threads to log information into a log file but not have access to the contents referenced by the thread entity (to which other threads would have also written) or close access to the thread entity, then the parent thread would set the O_TEPL_WRONLY or O_TEPL_NOCLOSE flag, respectively.

Further, the TEPLs can be restricted by using the O_TEPL_EXCL flag, which does not allow access to other threads, thereby avoiding any synchronization issues such as read after write/read before write with respect to the other threads.

Embodiments of the invention address the scenario in which other threads close the thread entities created by the parent thread inadvertently. Such scenario can cause the parent thread to behave unexpectedly and even terminate depending on the nature of its operation. The flag O_TEPL_NOCLOSE provides read/write access to other threads but does not allow other threads to close the thread entity opened by the parent thread.

The TEPL should agree with the file open mode privilege. i.e., a file opened in read mode can only have its TEPLs set to O_TEPL_RDONLY, O_TEPL_EXCL, O_TEPL_NOCLOSE and not O_TEPL_WRONLY or O_TEPL_RDWR.

The special descriptor's STDIN, STDOUT and STDERR by default can be accessed by all the threads inside a process, and if needed, the Main thread can set TEPLs like O_TEPL_NOCLOSE, thereby preventing other threads from closing them inadvertently.

Figure 4:
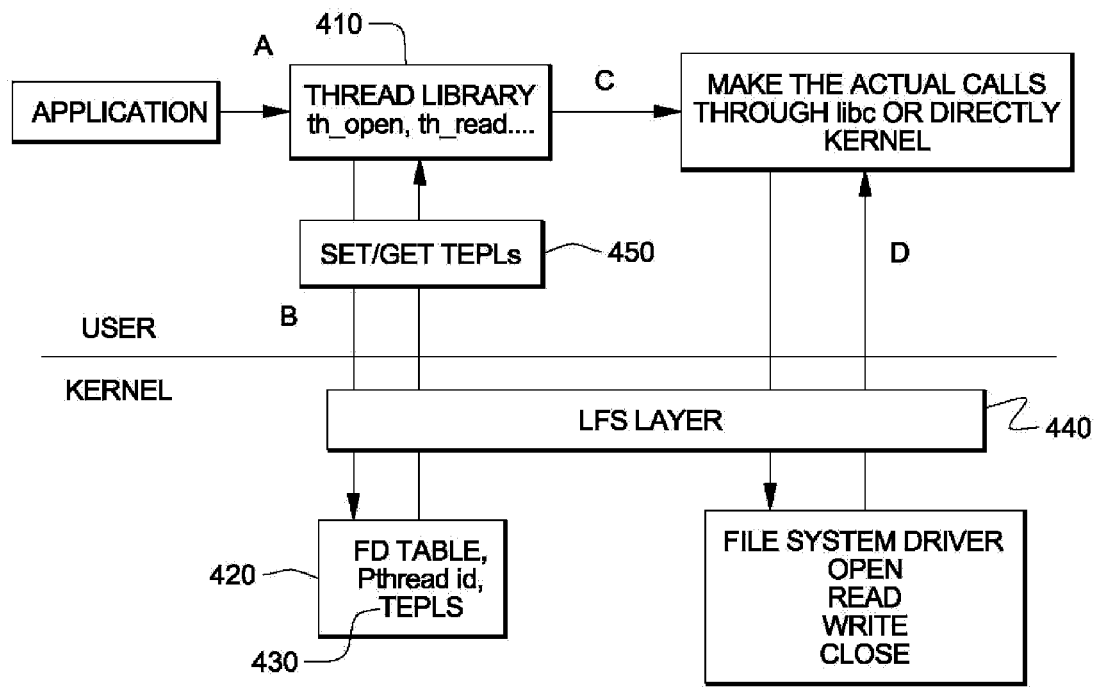
FIG. 4 shows an exemplary embodiment of the control flow when an embodiment of the invention is enabled and used in a computing system.

FIG. 4 shows an exemplary embodiment of the flow of control when TEPL is enabled. TEPL checks will be enforced in the thread library 410. Since the TEPL check is not made in the file system layer, the thread library will need access to the file descriptor table 420 to know the TEPLs 430 of the thread entity and the owner thread ID.

In a further embodiment, provisions are thus made in logical file system layer 440 to export certain functionality, represented at 450, for the thread library to access the stored TEP and thread ID values that were earlier stored along with file descriptor table.

The terminology used herein is for the purpose of describing particular embodiments only and is not intended to be limiting of the invention. As used herein, the singular forms "a", "an" and "the" are intended to include the plural forms as well, unless the context clearly indicates otherwise. The corresponding structures, features, materials, acts, and equivalents of all means or step plus function elements in the claims below are intended to include any structure, material, or act for performing the function in combination with other claimed elements as specifically claimed.

While it is apparent that embodiments of the invention herein disclosed is well calculated to fulfill the objects stated above, it will be appreciated that numerous modifications and embodiments may be devised by those skilled n the art, and it is intended that the appended claims cover all such modifications and embodiments as fall within the spirit and scope of this invention.

What is claimed is:

1. A method comprising:
generating a group of threads in a process, wherein each thread among the group of threads has a respective thread identifier (ID);
opening a thread entity for a first thread among the group of threads, wherein the thread entity is one of a file descriptor and a socket descriptor;
specifying, in agreement with an associated open mode privilege, one or more levels of access to the thread entity for all other threads among the group of threads;
storing in a table the thread ID of the first thread;
upon determining that a certain thread among the group of threads is attempting to perform a specified operation on the thread entity, determining whether the thread ID of the certain thread matches the thread ID of the first thread stored in the table;
upon determining that the thread ID of the certain thread matches the thread ID of the first thread, allowing the certain thread to perform the specified operation;
upon determining that the thread ID of the certain thread does not match the thread ID of the first thread, determining whether the specified operation is allowed by the specified one or more levels of access; and
upon determining that the specified operation is allowed by the specified one or more levels of access, allowing the certain thread to perform the specified operation.

2. The method of claim 1, wherein the one or more levels of access are selected from a group comprising a first level defined to permit read only access to the thread entity and a second level defined to permit write only access to the thread entity.

3. The method of claim 1, wherein the one or more levels of access include a level defined to prohibit access to the thread entity.

4. The method of claim 1, wherein the one or more levels of access include a level defined to allow read and write access to the thread entity but to prohibit closure of the thread entity.

5. A system comprising:
a processor; and
a memory storing a program, which, when executed on the processor, performs an operation comprising:
generating a group of threads in a process, wherein each thread among the group of threads has a respective thread identifier (ID);
opening a thread entity for a first thread among the group of threads, wherein the thread entity is one of a file descriptor and a socket descriptor;
specifying, in agreement with an associated open mode privilege, one or more levels of access to the thread entity for all other threads among the group of threads;
storing in a table the thread ID of the first thread;
upon determining that a certain thread among the group of threads is attempting to perform a specified operation on the thread entity, determining whether the thread ID of the certain thread matches the thread ID of the first thread stored in the table;
upon determining that the thread ID of the certain thread matches the thread ID of the first thread, allowing the certain thread to perform the specified operation;
upon determining that the thread ID of the certain thread does not match the thread ID of the first thread, determining whether the specified operation is allowed by the specified one or more levels of access; and upon determining that the specified operation is allowed by the specified one or more levels of access, allowing the certain thread to perform the specified operation.

6. The system of claim 5, wherein the one or more levels of access include a level defined to allow read and write access to the thread entity but to prohibit closure of the thread entity.

7. The system of claim 5, wherein the one or more levels of access are selected from a group comprising a first level defined to permit read only access to the thread entity and a second level defined to permit write only access to the thread entity.

8. The system of claim 5, wherein the one or more levels of access include a level defined to prohibit access to the thread entity.

9. A non-transitory computer usable medium storing an application, which, when executed on a processor, performs an operation comprising:

generating a group of threads in a process, wherein each thread among the group of threads has a respective thread identifier (ID);

opening a thread entity for a first thread among the group of threads, wherein the thread entity is one of a file descriptor and a socket descriptor;

specifying, in agreement with an associated open mode privilege, one or more levels of access to the thread entity for all other threads among the group of threads;

storing in a table the thread ID of the first thread;

upon determining that a certain thread among the group of threads is attempting to perform a specified operation on the thread entity, determining whether the thread ID of the certain thread matches the thread ID of the first thread stored in the table;

upon determining that the thread ID of the certain thread matches the thread ID of the first thread, allowing the certain thread to perform the specified operation;

upon determining that the thread ID of the certain thread does not match the thread ID of the first thread, determining whether the specified operation is allowed by the specified one or more levels of access; and upon determining that the specified operation is allowed by the specified one or more levels of access, allowing the certain thread to perform the specified operation.

10. The non-transitory computer usable medium of claim 9, wherein the one or more levels of access include a level defined to allow read and write access to the thread entity but to prohibit closure of the thread entity.

11. The non-transitory computer usable medium of claim 9, wherein the one or more levels of access are selected from a group comprising a first level defined to permit read only access to the thread entity and a second level defined to permit write only access to the thread entity.

12. The non-transitory computer usable medium of claim 9, wherein the one or more levels of access include a level defined to prohibit access to the thread entity.

* * * * *